United States Patent [19]  [11] 4,331,412
Graf  [45] May 25, 1982

[54] RETRACTABLE PALLET SECURING DEVICE

[75] Inventor: Michael C. Graf, Memphis, Tenn.

[73] Assignee: Brooks & Perkins, Incorporated, Southfield, Mich.

[21] Appl. No.: 96,925

[22] Filed: Nov. 23, 1979

[51] Int. Cl.³ .................. B60P 7/08; B61D 45/00; B63B 25/22
[52] U.S. Cl. ................................ 410/69; 244/118.1; 410/78
[58] Field of Search ............... 410/77, 78, 79, 80, 410/81, 111, 69; 244/118.1

[56] References Cited

U.S. PATENT DOCUMENTS

| | | | |
|---|---|---|---|
| 3,282,550 | 11/1966 | Warren | 410/77 |
| 3,693,920 | 9/1972 | Trautman | 410/77 |
| 3,831,532 | 8/1974 | Smith et al. | 410/111 X |
| 4,234,278 | 11/1980 | Harshman et al. | 410/77 X |

Primary Examiner—Joseph F. Peters, Jr.
Assistant Examiner—Howard Beltran
Attorney, Agent, or Firm—Whittemore, Hulbert & Belknap

[57] ABSTRACT

A retractable center guide and vertical and lateral load restraint for a cargo carrying aircraft. The devices are mounted along the center line of the aircraft and in erect position include laterally extending arms adapted to overlie the edges of load carrying structure such as pallets. The devices are pivoted for swinging about axes extending transversely of the aircraft so that if a device is in the path of an advancing load carrying structure, it will be pivoted to retracted position, thus avoiding damage to the device or load carrying structure. Resilient means are provided effectively to maintain the device either in erect or in retracted position, or the resilient means may restore the device to an erect position if it is released after being moved to retracted position. The series of devices together with guide surfaces at the side of the aircraft, constitute an elongated guideway along which load carrying structure may be advanced. Finally, in erect position with load carrying structure at the side of a device, the device operates as a restraint against lateral movement of the load carrying structure.

17 Claims, 7 Drawing Figures

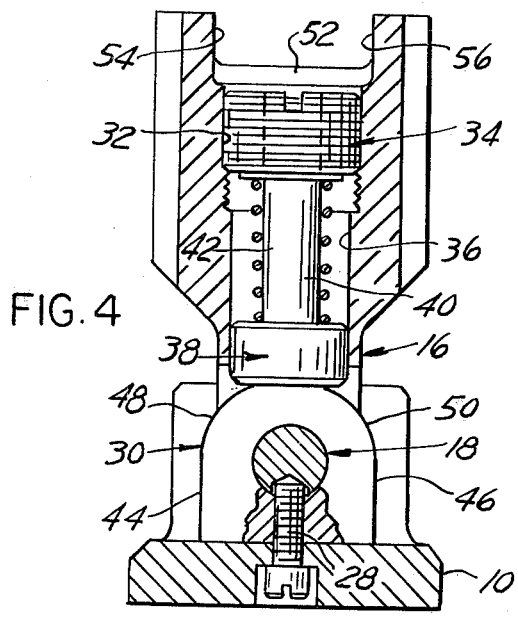
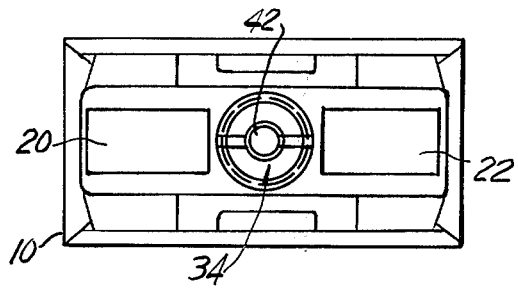
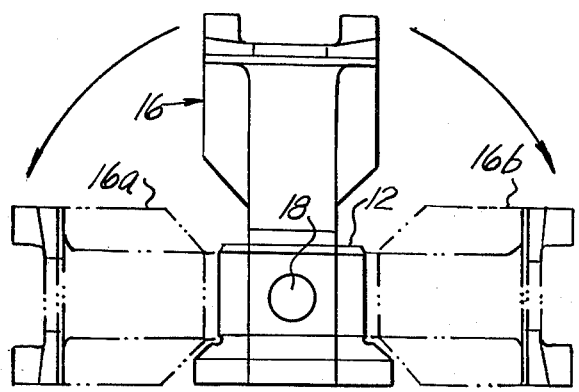
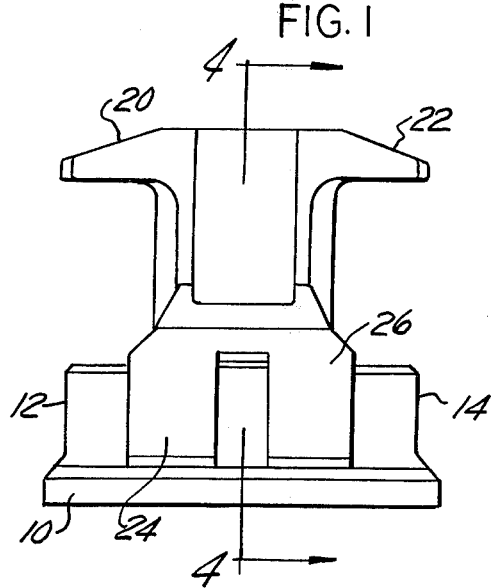
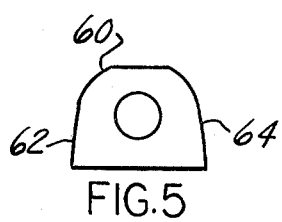
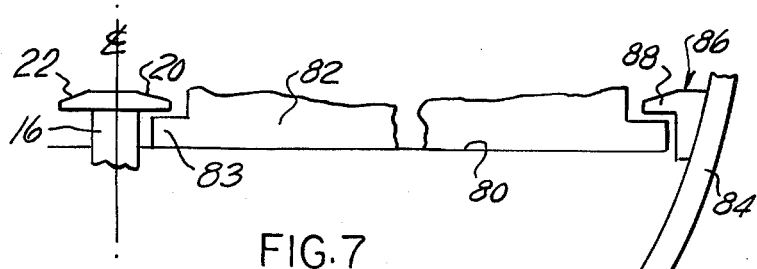
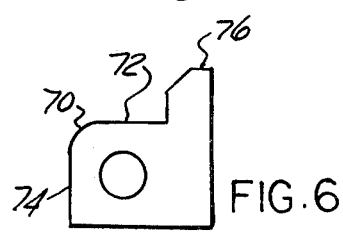

RETRACTABLE PALLET SECURING DEVICE

BACKGROUND AND SUMMARY OF THE INVENTION

In cargo carrying aircraft it is usual for the cargo to be secured on pallets or other load carriers such as containers which are introduced into the aircraft either through a rear door or a side door and are moved longitudinally of the aircraft into the position which they are to occupy in flight over load carrying rollers.

In some cases cargo may be received within containers, in which case the bottom of the container may be considered as equivalent to a pallet with suitable modification being made to the sides and/or ends of the container to accommodate restraint means. For convenience the cargo carrying structure will usually be referred to herein as a pallet, but it is to be understood that this term encompasses a container.

As the pallet is moved within the aircraft into the position which it is to occupy in flight, it is desirable to provide guide means positioned at the side of the path traversed by the pallet, which furnishes guides for the pallet as it is moved into final position.

While in some cases the pallet may occupy substantially the full width of the cargo carrying space, the present invention is designed for use with pallets which have a width somewhat less than one-half the width of the cargo carrying space or load support surface, and which in flight occupy a position at one side or the other of a longitudinal center line. Where the pallets are in the final loaded position, it is required to provide longitudinal, lateral and vertical restraint. The present invention is concerned with fixtures referred to herein as restraints which are intended to be mounted in a longitudinally extending row along the center line of the aircraft and to constitute abutments serving as lateral guides and restraints as well as vertical restraints preventing upward movement of the loaded pallets as might otherwise occur in flight.

It is desirable that restraints be retractable below the level of the usual load supporting rollers defining the load support surface of the aircraft, so that pallets of different shapes and sizes may move without interference over the restraints in loading and unloading the vehicle. In the past it has been known to provide retractable restraints pivoted about axes extending longitudinally of the aircraft so that they may be manually swung into retracted position. However, such restraints have no provision for yielding when engaged by longitudinally moving pallets, and accordingly, unless retracted, may be broken or damaged when engaged by such longitudinally moving pallet.

In accordance with the present invention, restraints are provided which are pivoted for movement into and out of operating position, or in other words into and out of retracted position, about transversely extending axes so that if in erect or operating position as a pallet is moved into engagement therewith, the restraint is pivoted by the pallet into retracted position and the pallet is permitted to move freely over the restraint.

In accordance with the present invention the restraints include upwardly extending pivoted guides or posts which however are not yieldable laterally and thus are effective to constitute lateral guides for pallets moving along one side or the other of the center line of the aircraft as well as lateral restraints for the pallet in flight.

In addition the restraints include laterally extending vertical restraining arms at the upper or free ends of the post which are adapted to overlie edge portions of the pallet in loaded position and to prevent upward movement of the pallet away from the deck of the cargo space.

Spring means are provided which are effective to perform in different modes according to the particular requirements of the cargo system. In one mode the springs are effective to retain the posts upwardly or in either forwardly or rearwardly retracted position. In a second mode the spring means are effective to retain the posts in upwardly extending position unless positively moved to retracted position, and to return the posts to upright position immediately upon release. Finally in a third mode means are provided to limit pivoting retraction of the post to one direction only so that the post acts as a fixed abutment limiting further movement of a pallet coming into engagement therewith.

BRIEF DESCRIPTION OF THE DRAWINGS

FIG. 1 is an elevational view of the restraint as viewed longitudinally of the vehicle.

FIG. 2 is a plan view of the restraint seen in FIG. 1.

FIG. 3 is a side view of the restraint showing the pivoted post portion thereof in limiting retracted positions.

FIG. 4 is a sectional view on the line 4—4, FIG. 1.

FIGS. 5 and 6 are elevational views of differently shaped cams for providing different modes of operation of the restraint.

FIG. 7 is a diagram showing the location and operation of the restraint in a cargo aircraft.

DETAILED DESCRIPTION

The restraints illustrated in FIGS. 1-4 are adapted to be fixedly secured to the deck of a cargo aircraft in position to cooperate with the particular pallets being employed. While forming no part of the present invention it may be noted that cargo carrying aircraft decks are normally provided with longitudinally extending recessed rails to which suitable cargo guides and restraints may be secured in selected positions.

The restraint seen in the figures comprises a base 10 having upstanding ears 12 and 14. The restraint comprises a pivoted guide or post 16 mounted for pivoted movement about a shaft 18, the ends of which are retained in cylindrical openings provided in the ears 12 and 14.

At its upper end the post 16 is provided with oppositely laterally extending arms 20 and 22 which are adapted to overlie side edges of loaded pallets and thus to prevent upward movement thereof.

The post 16 terminates at its lower end in apertured lugs 24 and 26 having openings therein receiving the pivot pin 18. As previously noted, the pivot pin 18 extends transversely of the aircraft so that the post indicated generally at 16 is adapted to be swung forwardly or rearwardly to the dotted line positions indicated at 16a and 16b in FIG. 3.

The pivot shaft 18 is retained in operating position by a screw 28 extending upwardly through a counterbored opening in the bottom wall of the base 10, the upper end of the screw being received in a recess in the shaft 18 as best seen in FIG. 4. In addition the screw 28 extends through a threaded opening provided in a cam 30. In FIG. 4 it will be observed that the head of screw 28 is received in a counter-sunk portion of the opening in the base and when the screw is tightened, clamps the cam 30 firmly to the base. The upper end of the screw also serves to lock the shaft 18 in position.

The upper end of the post 16 has a threaded opening 32 which receives an externally threaded annular adjusting nut 34, which is thus movable vertically in the threaded opening. Below the threaded opening 32 the post 16 is provided with a cylindrical opening 36 which constitutes a guide for the head 38 of a spring-urged plunger 40. Received beneath the annular adjusting nut 34 is a compression spring 42, the upper end being engageable by the adjusting nut 34 and the lower end being engageable with the head 34 of the plunger 40. By vertical adjustment of the nut 34, the initial compression of the spring 42 may be adjusted as desired.

The cam 30 according to one mode may have the shape illustrated in FIG. 4, which comprises an upper horizontal surface, engageable by the head 38 of the plunger, vertical flat side surfaces 44 and 46, and arcuate top corners 48 and 50.

With this arrangement and with the parts in the position best illustrated in FIG. 4, it will be apparent that tilting of the post 16 in either direction from the illustrated position is opposed by the spring 42. However when the post is swung through a 90° arc to either of the dotted line positions illustrated at 16a and 16b, the head of the plunger engages the vertical sides 44 or 46 of the cam and resiliently retains the post in retracted position. When the post is in the retracted position illustrated at 16a or 16b, it is necessary to apply upward lifting force to restore the post to its operating position. For this purpose the upper end of the post or the upper surface of the arms 20 and 22 is provided with a transversely extending recess 52 leaving fingers 54 and 56.

It is posssible to provide a different mode of operation by substituting the cam 60 illustrated in FIG. 5. In this case the side surfaces of the cam as indicated at 62 and 64 are inclined inwardly and upwardly at small angles such that when the post 16 is swung to the positions illustrated at 16a or 16b of FIG. 3, and released, the spring will cause the post 16 to return to the upright position.

Referring now to FIG. 6 there is illustrated a third embodiment of cam at 70 which is adapted to provide yet another mode of operation. In this case the cam 70 includes the flat horizontal upper surface 72 engageable by the heading 38 of the plunger and adapted to retain the post 16 in upright position. The cam 70 also includes a flat vertical side surface 74 engageable by the head 38 of the plunger when the post has been swung 90° in one direction to a fully retracted post, in which case it may be restored to upwardly extending operating position by lifting on the appropriate fingers 54 or 56. In this case however the cam 70 is provided with a rigid abutment portion 76 which is engageable by one side of the post 16 to prevent swinging movement to the other retracted position. Thus the cam ensures that the post 16 operates as a rigid abutment when engaged by a pallet tending to move to the right relative to the cam illustrated in FIG. 6.

It will of course be apparent that a rigid abutment such as illustrated on the cam at 76 in FIG. 6 might be provided on the cam 60, in which case the post 16 would be prevented from swinging from retracted position in one direction of pallet movement, but would be movable in the opposite direction when engaged by a pallet moving in such direction, with the additional function that when the pallet moves beyond the restraint, the post 16 will automatically be restored by the spring 42 to its upright operating position.

As described in the foregoing the restraint is attached to the floor structure, normally on the center line of the aircraft and provides guides and lateral and vertical restraint for pallets dimensioned to be positioned at one side or the other of the center line. The restraint has a fold down or knock down feature which protects the assembly or aircraft structure. A previous known restraint was movable laterally into retracted position, and if while in the raised position, it was impacted by a pallet moving longitudinally of the aircraft, damage might occur rendering the restraint inoperative. If the impact is sufficiently great, damage to the aircraft might result. The amount of pressure required to move the guide to retracted position is adjustable within the assembly and of course by using springs of different rates, the adjustment range may be changed.

Referring now to FIG. 7 there is a diagrammatic view illustrating the manner in which the restraint functions in a cargo aircraft. In this figure there is illustrated a load supporting surface 80 which in practice may be the plane determined by the upper surface of a multiplicity of rollers, and represents the support surface for the cargo. A load carrier 82 is illustrated as engaging the load supporting surface. As previously described the load carrier may constitute a pallet or it may be in the form of a suitable container having laterally extending flange portions such as 83. A portion of the side of the aircraft is illustrated at 84 and is shown as provided with a lateral guide and vertical restraint member 86 which includes an inwardly extending flange or arm 88. The upper portion of the guide 16 is illustrated in this figure in its erect position extending above the plane of the load supporting surface 80. The guide 16, as previously described includes laterally extending arms 20 and 22. The arm 20 is illustrated as overlying the inner edge 83 of the load support. From the foregoing it will be seen that the load carrier is restrained against lateral movement to the left by the guide 16 and lateral movement to the right by the restraint member 86. In addition, the arms 20 and 88 prevent upward movement of the load carrier relative to the plane of the support surface 80.

It will be recalled of course that the guide 16 is mounted for pivotal movement about an axis which extends transversely of the aircraft and is of course prevented from lateral movement by the co-action between the ears and lugs by which it is mounted to the base 10.

It may be assumed that FIG. 7 illustrates the condition existing when a load carrier 82 is fixed in position in the aircraft, suitable means (not shown) being provided to prevent movement longitudinally of the aircraft.

The same figure of course illustrates the condition which exists as a pallet is pushed longitudinally of the aircraft into the fully loaded position. At such time the flanges at the side edges of the load carrier 82 or the edge portions of a pallet, pass beneath the confronting arms 20 and 88. At this time of course there is nothing to cause the load carrier to move upwardly away from the load surface 80. The restraint member 86 and the guide 16 have confronting surfaces spaced slightly from the lateral edges of the load carrier, which guide it as it is moving longitudinally of the aircraft.

In FIG. 7 the center line of the elongated load support surface 80 of the aircraft is so designated. It will of course be apparent that if smaller pallets or load carriers are used, the longitudinally extending rows of restraints including the guide or post 16 and arms 20 and 22 will be placed to accommodate the particular load carriers. Thus for example two intermediate longitudinally extending rows of restraints may be provided for cooperation with a multiplicity of load carriers, each of which has a width of somewhat less than one-third the width of the cargo carrying surface.

I claim:

1. A restraint for use in cargo carrying aircraft having an elongated cargo carrying deck space over which cargo carrying units are slidable longitudinally thereof, said restraint comprising a base adapted to be fixed to the deck of said space, an elongated guide post pivoted at one end to said base, pivot means connecting said one end of said post to said base, said pivot means providing for pivotal movement of said post about a first axis transverse to the length of said elongated deck space and effective to prevent pivotal movement of said post about an axis parallel to the length of said space, said post having an upright operating position and a retracted substantially horizontal position in which said restraint is below the cargo supporting surface of said deck space, said post having at its other end a laterally extending arm extending transversely of the length of said elongated deck space adapted when said post is in upright position to overlie a lateral edge of a cargo carrying unit and to form a lateral guide during movement of the cargo carrying unit longitudinally of the elongated deck space, resilient means acting between said base and said guide post operable to retain the guide post in upright position, and also being yieldable to provide for pivotal movement of the guide post to retracted position when engaged by a cargo carrying unit moving longitudinally over the elongated deck space.

2. A restraint as defined in claim 1, in which said guide post has at its said other end a second arm extending laterally of said post and oppositely to said first mentioned arm.

3. A restraint as defined in claim 1 in which said resilient means is effective yieldably to retain said post in forwardly and rearwardly extending fully retracted position.

4. A restraint as defined in claim 3, comprising finger grip means at the free end of said past by means of which it may be grasped and moved manually to upright operating position.

5. A restraint as defined in claim 4, in which said finger grip means comprises a groove extending across the free end of said arm to provide separated fingers one of which is uppermost when the post is in retracted position.

6. A restraint as defined in claim 1, in which said resilient means comprises a fixed cam extending around the pivot axis of said post, said post having a longitudinally extending opening, a plunger slidable in the opening and engaging said cam, and a spring in said opening urging said plunger against said cam.

7. A restraint as defined in claim 6, said cam having a flat top surface and at least one flat side surface, said plunger having a flat end surface engageable with said top surface or side surface when said post is in upright and retracted position, respectively.

8. A restraint as defined in claim 6, said cam having a flat top surface, and opposed flat side surfaces, said plunger having a flat end surface engageable with said flat top surface or one of said flat side surfaces when said post is in upright and retracted position, respectively.

9. A restraint as defined in claim 6, said cam having a flat top surface and at least one inclined side surface, said plunger having a flat end surface engageable with said top surface and side surface when said post is in upright and retracted position, respectively, to provide for movement of said post to retracted position as a pallet is moved longitudinally of the aircraft over the restraint and for automatic return of the post to upright position when released by the pallet.

10. A restraint as defined in claim 6, said cam having a flat top surface, a rigid stop in position to engage said post to prevent movement in one direction from its upright position, and a flat side surface, said plunger having a flat end surface engageable with said top or side surface of said cam when said post is in upright and retracted position, respectively.

11. A restraint as defined in claim 1, said base having a pair of spaced upstanding apertured ears, said post having a pair of spaced apertured lugs at its lower end, a pivot shaft extending through the apertures in said lugs and ears, an apertured cam on said shaft between said lugs, said post having a longitudinally extending opening therethrough, said resilient means comprising a plunger in said opening having its inner end engaging said cam, a spring seat adjacent the outer end of said post, and a spring interposed between said spring seat and said plunger.

12. A restraint as defined in claim 11, in which said spring seat has a threaded connection to the opening in said post to vary the force of said spring.

13. A restraint as defined in claim 11, said cam having a threaded opening extending from its bottom surface to its shaft-receiving aperture, said shaft having a recess in registration with the threaded opening in said cam, said base having an opening in registration with the threaded opening in said cam and the recess in said shaft, and a beaded bolt having its head below the opening in said base threaded through said cam and extending into the recess in said shaft to fix said cam to said base and to lock said shaft in position in the aperture in said ears and lugs.

14. In combination, in an aircraft, an elongated load support surface over which load carriers are movable longitudinally of the support surface, said aircraft having a side wall defining one lateral edge of said load support surface, lateral guide and restraint members carried by said aircraft adjacent the side wall of the aircraft in an outer row extending longitudinally thereof, said members including restraint arms extending inwardly to overlie a lateral edge of said elongated support surface, and to overlie the adjacent edge of a cargo carrying unit moving longitudinally of said surface, a multiplicity of retractable guide and restraint devices mounted on the aircraft in a longitudinally extending row spaced laterally inwardly from said outer row and parallel thereto, each of the retractable guide and restraint devices comprising a base and an elongated guide post pivoted at its lower end to said base for pivotal movement about an axis perpendicular to said rows into a retracted position in which it is retracted entirely below the load support surface of the aircraft and resilient means acting between said base and said guide post operable to retain the guide post in upright position and also being yieldable to provide for pivotal movement of the guide post to retracted position.

15. A structure as defined in claim 14, comprising means preventing lateral displacement of said posts whereby said posts constitute guiding abutments for cargo carrying units.

16. The combination as defined in claim 14 in which each of said guide posts has at its free end oppositely and laterally extending arms which when all of the guide posts are in upstanding position define a guide channel in which lateral edge portions of a multiplicity of load carriers are slidable as they are moved longitudinally of the aircraft into and out of loaded position.

17. The combination as defined in claim 16, in which the lateral guides and restraint members at the sides of the load support surface together define an elongated longitudinally extending laterally open channel facing the channel defined by the retractable restraints, said channels cooperating in guiding a plurality of load carriers into and out of loaded position and retaining loaded carriers against lateral and vertical movement during flight.

* * * * *